United States Patent Office 3,004,970
Patented Oct. 17, 1961

3,004,970
HALOACETIC ACID METHOD FOR PREPARING THIAMORPHOLINEDIONES
Glenn S. Skinner, Newark, Del., and John B. Bicking, Lansdale, Pa., assignors, by direct and mesne assignments, to Merck & Co., Inc., Rahway, N.J., a corporation of New Jersey
No Drawing. Filed Apr. 27, 1956, Ser. No. 580,983
3 Claims. (Cl. 260—243)

This invention is concerned with a novel process for preparing derivatives of thiamorpholinedione having the general structural formula:

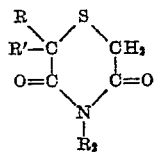

wherein R is a lower alkyl radical, either straight (i.e. continuous) or branched chain, such as methyl, propyl, amyl, isoamyl, heptyl, and the like; R' is a lower alkyl radical, either straight or branched chain, such as those illustrated above for R, an aryl radical, either unsubstituted for substituted by one or more halogen, alkoxy or alkyl radicals; $R_2$ is hydrogen or a lower alkyl or lower alkenyl radical, either straight or branched chain, such as a methyl, propyl, allyl, isobutyl, amyl and the like, an aralkyl, for example, a benzyl, cinnamyl and the like radicals, an acyl, derived from an aliphatic or an aromatic carboxylic acid, such as an acetyl, propionyl, benzoyl and the like.

The novel compounds prepared by the process of this invention are described in copending U.S. patent application Serial No. 430,976, filed May 19, 1954, now Patent 2,786,838, issued March 26, 1957, of which this application is in part a continuation. The thiamorpholinediones prepared by the method of this invention are useful chemotherapeutic agents, and are particularly useful as hypnotic agents, while some of them have marked anticonvulsant properties. Especially marked activity has been observed in the compounds illustrated by the structure above wherein R is an alkyl radical and R' is an alkyl or an aryl radical and $R_2$ is hydrogen or an alkyl radical. Among compounds of these types, those having particularly high activity both as hypnotic agents and as anticonvulsant agents are 2,2-diethyl-3,5-thiamorpholinedione, 2,2-diethyl-4-methyl-3,5-thiamorpholinedione, 2-ethyl-2-butyl-3,5-thiamorpholinedione, and 2-ethyl-2-phenyl-3,5-thiamorpholinedione.

The novel process of this invention comprises reacting an α,α-disubstituted-α-bromoacetyl bromide with thiourea to form a 5,5-disubstituted-2-imino-4-thiazolidone, which is then hydrolyzed to give a mixture of an α,α-disubstituted-α-mercaptoacetic acid and the corresponding α,α-disubstituted-α-mercaptoacetamide. This mixture of mercapto compounds is then reacted with a haloacetic acid to form the corresponding thiodiacetic acid and the monoamide of the thiodiacetic acid which can be separated readily by fractional crystallization because the monoamide is the higher melting and the less soluble product of the two. The organic solvent employed in the fractional crystallization varies, and its selection depends upon the particular compounds contained in the reaction mixture. Its selection would be obvious to a skilled organic chemist. Treatment of the diacetic acid with ammonium hydroxide or an amine followed by pyrolysis of the salt yields the desired 2,2-disubstituted-3,5-thiamorpholinedione or the 2,2,4-trisubstituted-3,5-thiamorpholinedione. The monoamide can be converted to the desired 2,2-disubstituted-3,5-thiamorpholinedione by pyrolysis.

HALOACETIC ACID METHOD

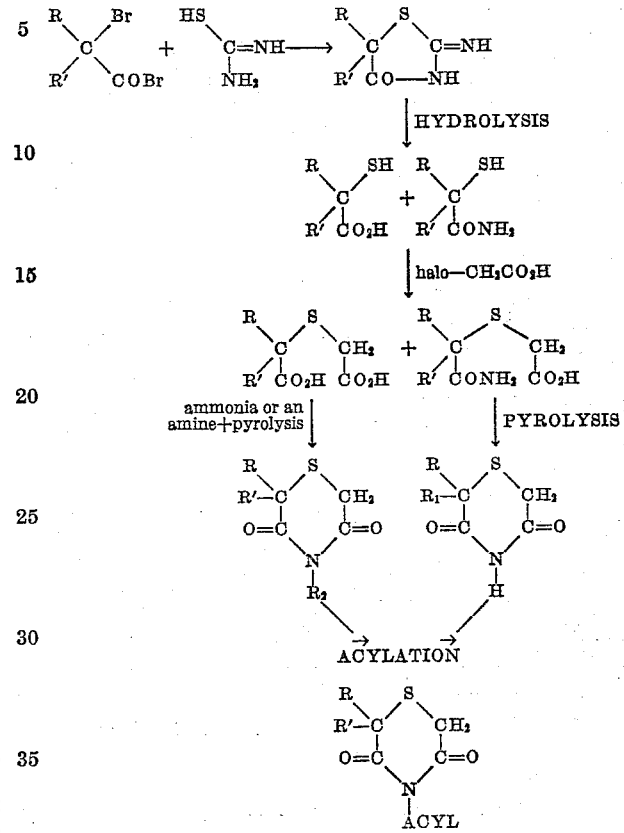

The first step in the method described above the conversion of the α,α-disubstituted-α-bromoacetyl bromide to the 5,5-disubstituted-2-imino-4-thiazolidone by reaction with thiourea, is a known reaction; however, the subsequent steps are new and provide a means whereby the ultimate thiamorpholinediones can be obtained in relatively high yield.

It has been found that, by hydrolyzing a 5,5-disubstituted-2-imino-4-thiazolidone in the presence of dilute sodium hydroxide or potassium hydroxide with heating, preferably under refluxing conditions, for from about 6 hours to 6 days, a very good yield of a mixture of α,α-disubstituted-α-mercaptoacetic acid and its amide is obtained. The duration of refluxing is determined upon the degree of conversion to the acid desired. Good results are most consistently obtained by refluxing the thiazolidone solution for about 1–2 days. The mercapto products obtained as a result of this hydrolysis are usually in the form of an oil. The oil need not be further purified, as it can be dissolved in an alkaline solution such as a dilute sodium or potassium hydroxide solution or a sodium or potassium carbonate solution and the like and then either treated with an equivalent quantity of bromoacetic acid or chloroacetic acid in an alkaline solution such as a dilute sodium or potassium hydroxide solution or a sodium or potassium carbonate solution to form the α,α-disubstituted-thiodiacetic acid and the corresponding monoamide. Reaction occurs readily upon the addition of the bromoacetic acid to the solution of the mercapto products. The alkaline solution employed can advantageously be a dilute solution having a concentration of about 10%, although a higher or lower concentration will not materially affect the reaction. The reaction forming the sulfide linkage is generally quite rapid.

Acidification of the reaction mixture following the reaction with bromoacetic acid causes an oily material to precipitate consisting of two compounds which can be separated readily by virtue of their greatly differing solubilities in organic solvents. Acidification is preferably accomplished by use of a mineral acid, although an organic acid, such as acetic acid, could also be employed. The more soluble compound is α,α-disubstituted-thiodiacetic acid, and the less soluble compound is the monoamide of α,α-disubstituted-thiodiacetic acid. The α,α-disubstituted-thiodiacetic acid upon reaction with ammonia or a substituted amine and in either case followed by pyrolysis yields the desired 2,2-disubstituted-3,5-thiamorpholinedione or the desired 2,2,4-trisubstituted-3,5-thiamorpholinedione. Reaction between the thiodiacetic acid and the ammonia or the amine readily occurs upon adding one reactant to the other. It will be understood that, when a substituted amine is used in this last step, the compound will have an alkyl, alkenyl or aralkyl radical attached to the nitrogen atom. Suitable amines are primary amines of the groups lower alkyl, lower alkenyl, mononuclear aryl-lower alkyl or mononuclear aryl-lower alkenyl. If it is desired to have an acyl radical attached to this nitrogen atom, this can be accomplished by heating the 2,2-disubstituted-3,5-thiamorpholinedione with an acyl halide or an acid anhydride.

The following examples will describe in greater detail the novel method of this invention. The examples are illustrative of this novel process and are not intended to be limitative, as variations and modifications can, and indeed must, be made in them in order to adjust the conditions to the particular requirements of the reactants employed. Such modifications, however, would be readily apparent to a chemist working in this art.

*Example I.—2,2-dibutyl-3,5-thiamorpholinedione*

STEP A

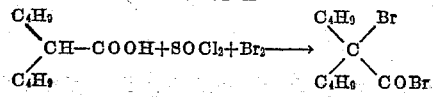

In a round-bottomed flask equipped with a dropping funnel and a condenser connected to an acid gas absorption trap was placed α-butylcaproic acid (2.0 moles). Thionyl chloride (262 g., 2.2 moles) was added dropwise over a period of 1 hour. The mixture was heated on a steam bath during the addition and for 1 hour longer. Then with continued heating, bromine (320 g., 2.0 moles) was added in small portions as rapidly as it would react. The time required for the addition of bromine was about 5 hours. Distillation of the reaction mixture from a Claisen flask gave 331.5 g. of α-bromo-α-butylcaproyl bromide, B.P. 129–140° C. (16 mm.).

STEP B

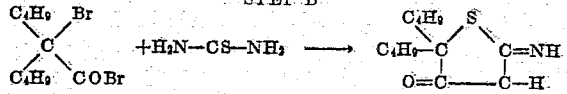

To a refluxing solution of thiourea (125 g., 1.65 moles) in acetic acid (600 cc.) in a 2-liter flask equipped with a condenser and dropping funnel, α-bromo-α-butylcaproyl bromide (173 g., 0.55 mole) was added dropwise during 20 minutes. The mixture was refluxed for an additional 15 minutes, and then the acetic acid was removed by distillation at reduced pressure. To the residue was added water (500 cc.), and the mixture was neutralized by the addition of concentrated ammonium hydroxide solution. The gummy, yellow solid which precipitated was collected on a filter and washed with ether. It was recrystallized from a water-ethanol mixture to give white crystalline 5,5-dibutyl-2-imino-4-thiazolidone, M.P. 216–222° C.

STEP C

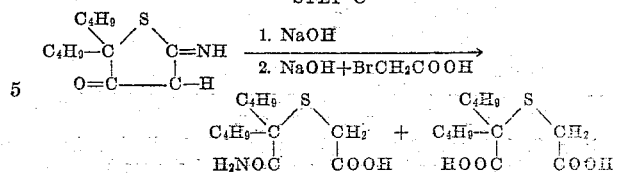

A mixture of the thus obtained 5,5-dibutyl-2-imino-4-thiazolidone (22.8 g., 0.100 mole) and 15% sodium hydroxide solution (120 cc.) was refluxed for 40 hours. The resulting solution was cooled and acidified to Congo red with concentrated hydrochloric acid. The oil which separated was taken up in ether. The ether was evaporated, leaving a colorless oil which was dissolved in 10% sodium hydroxide solution (80 cc.). To this solution was added a solution of bromoacetic acid (13.9 g., 0.100 mole) in 10% sodium hydroxide solution (40 cc.). After 15 minutes, the solution was acidified with concentrated hydrochloric acid. The white gummy substance which separated was taken up in ether and dried over sodium sulfate. The dried solution was concentrated to a volume of approximately 40 cc. and diluted with 100 cc. of petroleum ether (B.P. 30–60° C.). The resulting solution was chilled and 8.3 g. of impure crystalline α,α-dibutyl-α-carboxymethylmercaptoacetamide, M.P. 85–105° C., was deposited and separated by filtration. (The filtrate, which contained the diacetic acid, was set aside and subsequently converted to the thiamorpholinedione by the process described in Example II.) Two recrystallizations of the impure crystalline material from cyclohexane produced the pure product, M.P. 128–129° C.

STEP D

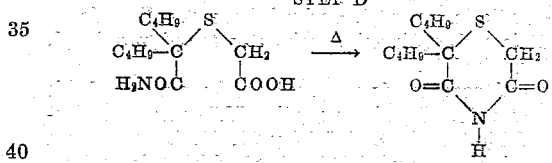

The α,α-dibutyl-α-carboxymethylmercaptoacetamide (6.3 g., 0.024 mole) was placed in a 50 cc. Claisen flask equipped for vacuum distillation. The amide was heated for 40 minutes at 140–160° C. under a pressure of 60 mm. Hg. The imide which had formed was then distilled at oil pump pressure. There was obtained 5.0 g. of very viscous oil. This product was redistilled to give 4.0 g. (68%) of 2,2-dibutyl-3,5-thiamorpholinedione.

*Example II.—2,2-dibutyl-3,5-thiamorpholinedione*

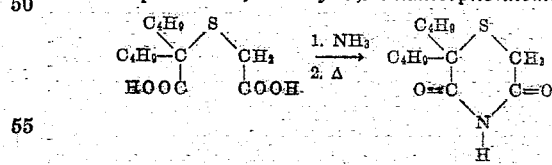

The solvents were completely evaporated from the filtrate from the impure acetamide, obtained in Step C, Example I, and the residue was dissolved in petroleum ether (30 cc.). This solution was chilled, and impure α,α-dibutylthiodiacetic acid, M.P. 60–70° C. was precipitated. This substance was dissolved in a hot mixture of concentrated hydrochloric acid (90 cc.) and acetic acid (60 cc.), and the solution was refluxed for 16 hours. The solution was then chilled, and an oil separated which quickly crystallized. There was obtained 8.5 g. α,α-dibutylthiodiacetic acid, M.P. 74–77° C., which was recrystallized from a mixture of cyclohexane and petroleum ether (1:15) to give the pure product, M.P. 76–77° C. To a solution of α,α-dibutylthiodiacetic acid (10.5 g., 0.040 mole) in ether (100 cc.) was added a 10% solution of ammonia in ethanol (6 cc.). The precipitated ammonium salt was collected, dried, and placed in a 50 cc. Claisen flask equipped for vacuum distillation. The salt was heated by means of a metal bath at 180–190° C.

for 45 minutes under a pressure of 80 mm. Hg. The bath temperature was then raised to 240° C., and the imide which had formed was distilled at oil pump pressure. There was obtained a very viscous oil. The oil was dissolved in ether (50 cc.). The solution was washed with two 25 cc. portions of saturated sodium bicarbonate solution and was dried over sodium sulfate. The ether was evaporated, and the residue was redistilled, yielding pure 2,2-dibutyl-3,5-thiamorpholinedione, B.P. 159–161° C. (1 mm.), $n_D^{24}$ 1.5126, $d^{24}$ 1.089.

*Example III.—2,2-diethyl-3,5-thiamorpholinedione*

STEP A

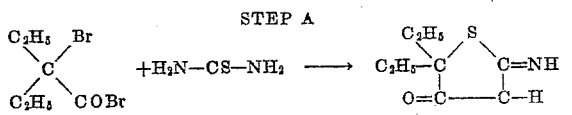

By replacing the α-bromo-α-butylcaproyl bromide employed in Step B of Example I by an equimolecular quantity of α-bromo-α-ethyl-butyryl bromide [prepared by replacing the α-butylcaproic acid by an equimolecular quantity of α-ethylbutyric acid and following substantially the same procedure described in Example I, Step A] and following substantially the same procedure described in Step B, Example I, there was obtained 5,5-diethyl-2-imino-4-thiazolidone, M.P. 219–225° C.

STEP B

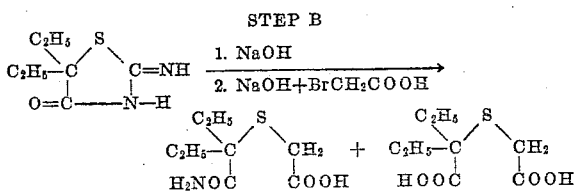

This thiazolidone (51.6 g., 0.30 mole) was dissolved in 15% sodium hydroxide (300 cc.) and then refluxed for 72 hours. The solution was cooled and acidified with concentrated sulfuric acid. The oil which separated was taken up in ether and dried over anhydrous sodium sulfate. The ether was evaporated leaving a colorless residual oil which was dissolved in 10% sodium hydroxide solution (240 cc.). To this was added a solution of bromoacetic acid (41.7 g., 0.30 mole) in 10% sodium hydroxide solution (120 cc.). After 30 minutes, the resulting solution was acidified with concentrated sulfuric acid. The oily acid which separated was taken up in ether and dried over sodium sulfate. The ether was evaporated and the residue was dissolved in a hot mixture of cyclohexane (200 cc.) and isopropyl alcohol (90 cc.). When this solution was chilled, a crystalline substance slowly separated. The precipitated solid material was removed by filtration and the filtrate set aside for use in Example IV. The solid product recovered was recrystallized from a cyclohexane-isopropyl alcohol mixture (4:1) yielding pure α,α-diethyl-α-carboxymethylmercaptoacetamide, M.P. 121–122° C.

STEP C

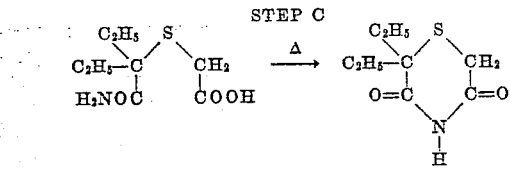

6.0 g. (0.029 mole) of the thus obtained monoamide was placed in a 50 cc. round-bottomed flask and heated by means of a metal bath at 160–170° C. for 45 minutes under a pressure of 60 mm. Hg. The amide melted and decomposed vigorously. The melt was cooled and triturated with saturated sodium bicarbonate solution (25 cc.). The product quickly crystallized. It was recrystallized from a water-isopropyl alcohol mixture (2:1) to give pure 2,2-diethyl-3,5-thiamorpholinedione, M.P. 85–86° C.

*Example IV.—2,2-diethyl-3,5-thiamorpholinedione*

STEP A

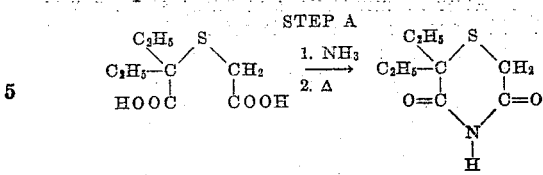

The solvents were completely removed from the filtrate obtained in Step B, Example III, and the residue was dissolved in 200 cc. of petroleum ether (B.P. 35–75° C.). The solution was chilled, yielding a crystalline precipitate of impure α,α-diethylthiodiacetic acid which was separated by filtration. The solvent was evaporated from the filtrate leaving an oily residue which slowly crystallized. The resulting crystalline cake was triturated with a small quantity of petroleum ether and sucked dry on a filter, yielding an additional quantity of impure α,α-diethylthiodiacetic acid. The two crops of impure product were combined, dissolved in 200 cc. of refluxing concentrated hydrochloric acid, and the solution was refluxed for 4 hours. On cooling, pure α,α-diethylthiodiacetic acid precipitated, M.P. 92–93° C.

The ammonium salt was prepared by dissolving the thus purified α,α-diethylthiodiacetic acid (10 g., 0.048 mole) in ether (50 cc.) and adding a 10% solution of ammonia in ethanol (15 cc.). The precipitated salt was collected, dried, and packed into a 25 cc. Claisen flask, fitted with a capillary boiling tube and having a receiver fused to the side arm. The salt was heated by means of a metal bath at 190° C. for 1¼ hours under a pressure of 60 mm. Hg. The pressure was then lowered to 30 mm. and the bath temperature raised to 220° C., whereupon the imide slowly distilled into the receiver. It was obtained as a yellowish, poorly crystalline substance. This crude product was dissolved in a hot mixture of water (40 cc.) and isopropyl alcohol (18 cc.). The solution, which was acidic, was neutralized by the addition of 5% sodium bicarbonate solution (12 cc.). When the solution was chilled, a crystalline product separated which was recrystallized from a mixture of water and isopropyl alcohol (2:1) yielding pure 2,2-diethyl-3,5-thiamorpholinedione, M.P. 85–86° C.

*Example V.—2,2-dipropyl-3,5-thiamorpholinedione*

STEP A

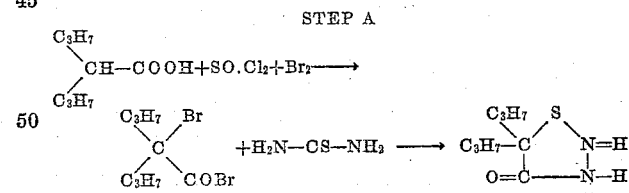

By replacing in Example I the α-butylcaproic acid by an equimolecular quantity of α-propylvaleric acid and following substantially the same procedure described in Steps A and B of Example I, there was obtained 5,5-dipropyl-2-imino-4-thiazolidone, M.P. 232–235° C.

STEP B

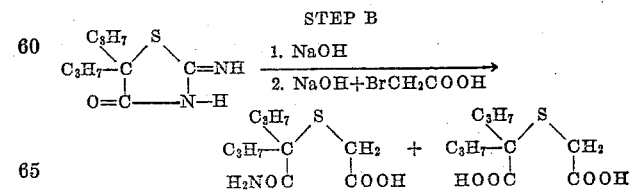

A solution of the thus obtained thiazolidone (34.5 g., 0.173 mole), in 15% sodium hydroxide solution (200 cc.) was refluxed for 46 hours. The solution was cooled and acidified with concentrated sulfuric acid. The oil which separated was taken up in ether and dried over sodium sulfate. The ether was evaporated, and the residual oil was dissolved in 10% sodium hydroxide solution (130 cc.). To this was added a solution of bromoacetic acid (24.0 g., 0.173 mole in 10% sodium hydroxide solution (70 cc.)). After 30 minutes the resulting solution was acidified with concentrated sulfuric acid. The oil which separated was taken up in ether and dried over sodium sulfate. The ether solution was diluted with petroleum ether (100 cc., B.P. 30–60° C.) and chilled. The precipitated material was separated by filtration and after one recrystallization from a mixture of cyclohexane and isopropyl alcohol (3:1) yielded α,α-dipropyl-α-carboxymethylmercaptoacetamide, M.P. 125–126° C. The filtrate obtained above was set aside for use in Example VI.

STEP C

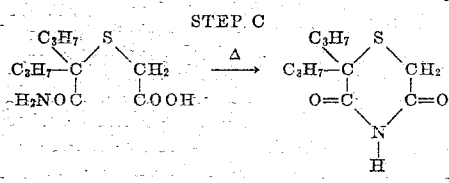

12.2 g. (0.052 mole) of this monoamide was placed in a 100 cc. round-bottomed flask and was heated by means of a metal bath at 170° C. for 35 minutes at a pressure of 60 mm. Hg. The amide melted and decomposed vigorously. The melt was cooled and triturated with 5% sodium bicarbonate solution, whereupon it quickly crystallized. The product was collected by filtration, dried, and recrystallized from hexane to give pure 2,2-dipropyl-3,5-thiamorpholinedione, M.P. 63–64° C.

*Example VI.—2,2-dipropyl-3,5-thiamorpholinedione*

STEP A

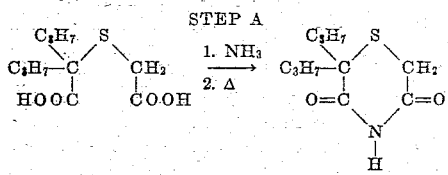

The solvents were completely evaporated from the filtrate obtained in Step B, Example V, and the residue was dissolved in hexane (70 cc.). This solution when chilled deposited impure α,α-dipropylthiodiacetic acid, M.P. 79–81° C. This product was dissolved in a hot mixture of concentrated hydrochloric acid (125 cc.) and acetic acid (65 cc.). The solution was refluxed for 36 hours. On cooling, a precipitate was obtained which was separated by filtration and upon recrystallization from hot water (300 cc.) yielded pure α,α-dipropylthiodiacetic acid, M.P. 96–97° C.

To a solution of the thus purified α,α-dipropylthiodiacetic acid (16.3 g., 0.07 mole) in ether (60 cc.) was added a 10% solution of ammonia in ethanol (20 cc.). The precipitated ammonium salt was collected, dried, and placed in a 125 cc. Claisen flask fitted with a capillary boiling tube and having a receiver fused to the side arm. The salt was heated by means of a metal bath at 190–200° C. for 40 minutes at a pressure of 80 mm. Hg. The pressure was then lowered to 20 mm., and the bath temperature was raised to 230° C., whereupon the 2,2-dipropyl-3,5-thiamorpholinedione slowly distilled into the receiver. The product, a yellow oil, was triturated with 5% sodium bicarbonate solution to give a soft, crystalline product. After three recrystallizations of this material from hexane, there was obtained pure 2,2-dipropyl-3,5-thiamorpholinedione, M.P. 63–64° C.

*Example VII.—2-ethyl-2-phenyl-3,5-thiamorpholinedione*

STEP A

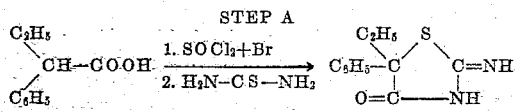

In a one-liter round-bottomed flask equipped with a dropping funnel and a condenser connected to an acid gas absorption trap was placed α-phenyl-butyric acid (170 g., 1.04 moles). Thionyl chloride (137 g., 1.15 moles) was added dropwise over a period of 1 hour. The mixture was heated on a steam bath during the addition. Then, with continued heating, bromine (166 g., 1.04 moles) was added in small portions as rapidly as it would react. The time required for the addition of the bromine was 6 hours. Nitrogen was then bubbled through the mixture for a few minutes to remove dissolved hydrogen chloride and any excess bromine. The product was added dropwise during 20 minutes to a refluxing solution of thiourea (228 g., 3.0 moles) in acetic acid (950 cc.) in a two-liter round-bottomed flask equipped with a dropping funnel and condenser. The mixture was refluxed for an additional 15 minutes, and then the acetic acid was removed by distillation at reduced pressure. To the oily residue was added water (500 cc.). The insoluble oil was removed by extraction with ether. The aqueous solution was made neutral by the addition of concentrated ammonium hydroxide solution. The crystalline precipitate was collected on a Buchner funnel and washed with two 50 cc. portions of ether. It was recrystallized from isopropyl alcohol to give 116.5 g. (51%) of 5-ethyl-5-phenyl-2-imino-4-thiazolidone, M.P. 208–210° C.

STEP B

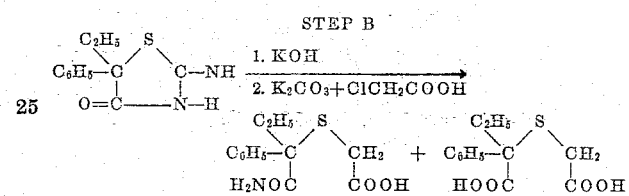

A solution of the thus obtained 5-ethyl-5-phenyl-2-imino-4-thiazolidone (8.0 g., 0.0365 mole) in 5% potassium hydroxide solution (120 cc.) was refluxed for 92 hours. The solution was cooled and acidified with concentrated sulfuric acid. The oily product which separated was taken up in ether. The ether was evaporated, and the residual oil was dissolved in 5% potassium hydroxide solution (60 cc.). To this solution was added a solution of chloroacetic acid (0.0365 mole) in 5% potassium carbonate solution. After 15 minutes, the solution was acidified with concentrated hydrochloric acid. The substance which separated was taken up in ether and dried over sodium sulfate. The resulting solution was chilled and crystalline α-ethyl-α-phenyl-α-carboxymethylmercaptoaceacetamide was deposited and separated by filtration. (The filtrate, which contained the diacetic acid, was set aside and subsequently converted to the thiamorpholinedione by the process described in Example VIII.) Two recrystallizations of the impure crystalline material from isopropyl alcohol yielded the purified monoamide, M.P. 142–144° C.

STEP C

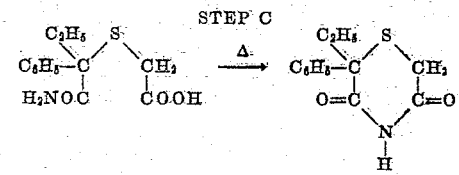

The α-ethyl-α-phenyl-α-carboxymethylmercaptoacetamide was then placed in a 50 cc. Claisen flask equipped for vacuum distillation. The amide was heated for about 40 minutes at 140–160° C. under a pressure of 60 mm. Hg. The imide which had formed was cooled and stirred with 5% sodium bicarbonate solution (50 cc.), whereupon it crystallized. The crude product was recrystallized from isopropyl alcohol yielding 2-ethyl-2-phenyl-3,5-thiamorpholinedione, M.P. 111–113° C.

*Example VIII.—2-ethyl-2-phenyl-3,5-thiamorpholinedione*

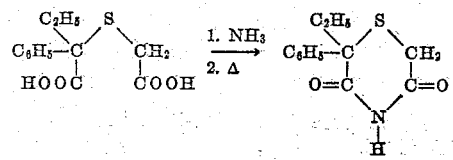

The solvents were completely evaporated from the filtrate obtained in Step B, Example VII, and the residue dissolved in hexane (70 cc.). When chilled, this solution deposited α-ethyl-α-phenyl-thiodiacetic acid. The thus obtained diacetic acid was reacted with ammonia and then pyrolyzed by substantially the same procedure described in Example VI, Step B, yielding 2-ethyl-2-phenyl-3,5-thiamorpholinedione, M.P. 111–113° C.

Other 2-alkyl-2-aryl-3,5-thiamorpholinedione derivatives wherein the aryl group is a halophenyl, alkoxyphenyl or alkylphenyl group can be prepared by replacing the α-phenylbutyric acid employed in Example VII with the appropriate carboxylic acid having the desired substituted-phenyl radical attached to the alpha-carbon atom and following substantially the same procedure described in Example VII.

*Example IX.—2,2-diethyl-4-methyl-3,5-thiamorpholinedione*

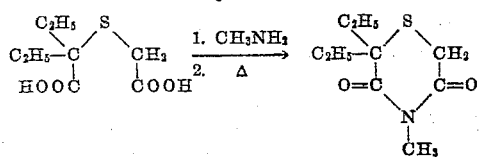

To a solution of α,α-diethylthiodiacetic acid (13.5 g., 0.066 mole), prepared as described in Example III, Steps A through B, in ether (50 cc.) was added a 33% solution of methylamine in ethanol (7 cc.). The precipitated methylammonium salt of α,α-diethylthiodiacetic acid was collected, dried, and placed in a 50 cc. Claisen flask. It was heated at 190° C. for 40 minutes under a pressure of 40 mm. Hg. The bath temperature was then raised to 220° C. and the pressure lowered to 25 mm. The product distilled. There was obtained 8.6 g. of a yellow oil. The oil was shaken with concentrated ammonium hydroxide solution (20 cc.). The insoluble oil was taken up in ether, dried and redistilled to give 4.6 g. (35%) of 2,2-diethyl-4-methyl-3,5-thiamorpholinedione, a colorless, mobile oil, B.P. 148–149° C. (16 mm.) $n_D^{24}$ 1.5184.

*Example X.—2,2,4-triethyl-3,5-thiamorpholinedione*

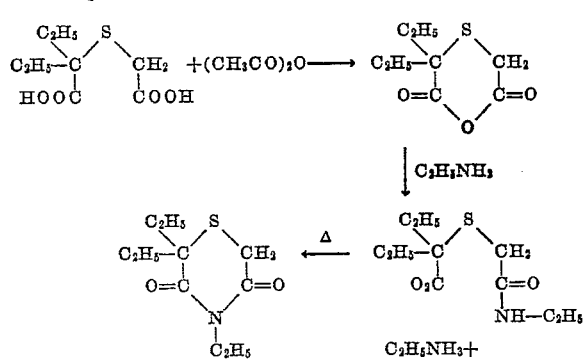

A solution of α,α-diethylthiodiacetic acid (30.9 g., 0.15 mole), prepared as described in Example III, Steps A through B, in acetic anhydride (100 cc.) was refluxed for 2 hours, and then distilled to give 24.5 g. of α,α-diethyl-thiodiacetic anhydride, B.P. 149–151° C. (15 mm.). The anhydride thus obtained was dissolved in ether (150 cc.) and a solution of ethylamine (20 cc.) in ether (100 cc.) was added slowly with ice-bath cooling. The precipitated ethylammonium salt of α,α-diethyl-α(N-ethylcarbamylmethylmercapto)-acetic acid was placed in a 125 cc. Claisen flask and heated at 180–200° C. for 30 minutes under a pressure of 40 mm. Hg. The bath temperature was then raised to 250° C. and the pressure lowered to 16 mm. The product distilled. There was obtained 14.4 g. of an orange oil. The oil was shaken with 50 cc. of concentrated ammonium hydroxide. The insoluble fraction was taken up in ether and redistilled to give 8.8 g. (32%) of 2,2,4-triethyl-3,5-thiamorpholinedione, B.P. 146–148° C. (15 mm.), $n_D^{25}$ 1.5082.

*Example XI.—2,2-diethyl-4-allyl-3,5-thiamorpholinedione*

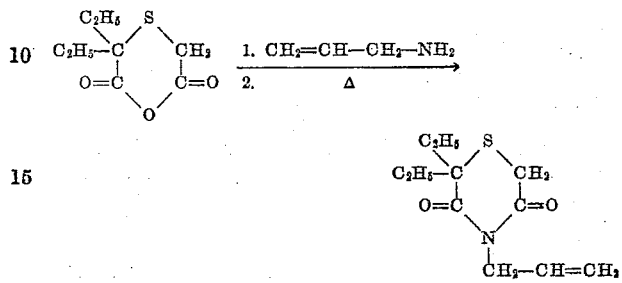

By replacing the ethylamine employed in Example X with an equivalent quantity of allylamine, and following substantially the same procedure described in Example X there was obtained 2,2-diethyl-4-allyl-3,5-thiamorpholinedione, B.P. 160–161° C. (16 mm.).

*Example XII.—2,2-diethyl-4-benzyl-3,5-triamorpholinedione*

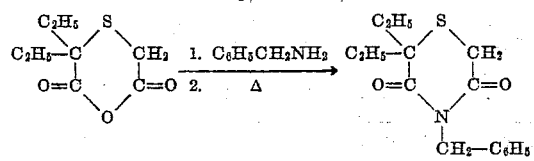

By replacing the ethylamine employed in Example X with an equivalent quantity of benzylamine, and following substantially the same procedure described in Example X, there was obtained 2,2-diethyl-4-benzyl-3,5-thiamorpholinedione, B.P. 173° C. (3 mm.).

*Example XIII.—2,2-diethyl-4-cinnamyl-3,5-thiamorpholinedione*

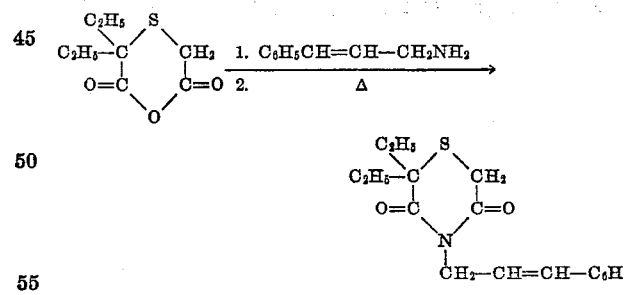

By replacing the ethylamine employed in Example X with an equivalent quantity of cinnamylamine, and following substantially the same procedure described in Example X there was obtained 2,2-diethyl-4-cinnamyl-3,5-thiamorpholinedione.

*Example XIV.—2,2-diethyl-4-acetyl-3,5-thiamorpholinedione*

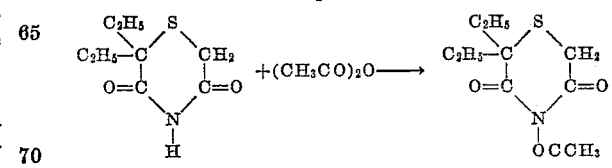

2,2-diethyl-3,5-thiamorpholinedione, prepared as described in Example III, dissolved in an excess of acetic anhydride was heated under reflux conditions for 4 days yielding 2,2-diethyl-4-acetyl-3,5-thiamorpholinedione.

Example XV.—2,2-diethyl-4-benzoyl-3,5-thiamorpholinedione

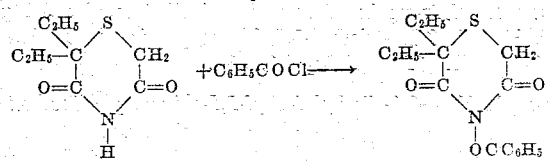

2,2-diethyl-3,5-thiamorpholinedione, prepared as described in Example IV, and an excess of benzoyl chloride dissolved in pyridine was refluxed for 4 days yielding 2,2-diethyl-4-benzoyl-3,5-thiamorpholinedione.

The symbol, Δ, used in some of the reaction formulae above indicates that the reaction takes place with heating.

The term oil pump pressure used in the foregoing examples indicates pressures in the range of from about 1 to 5 millimeters.

While the invention has been illustrated by a particular method for the preparation of 2,2-disubstituted 3,5-thiamorpholinedione and 2,2,4-trisubstituted 3,5-thiamorpholinedione compounds, the invention embraces modifications of the method described for their synthesis.

We claim:

1. In the process as claimed in claim 3, wherein the reaction between the mixture of α-R-α-$R^1$-α-mercaptoacetic acid and α-R-α-$R^1$-α-mercaptoacetamide and the haloacetic acid takes place in the presence of an alkaline reaction medium selected from the class consisting of dilute sodium hydroxide, potassium hydroxide, sodium carbonate and potassium carbonate solutions.

2. In the process for preparing 2-ethyl-2-phenyl-3,5-thiamorpholinedione, the steps comprising treating a mixture of α-ethyl-α-phenyl-α-mercaptoacetic acid and α-ethyl-α-phenyl-α-mercaptoacetamide with a monohaloacetic acid and subsequently acidifying the reaction mixture to form a precipitate consisting of α-ethyl-α-phenyl-thiodiacetic acid and α-ethyl-α-phenyl-α-carboxymethylmercaptoacetamide, separating the reaction products by fractional crystallization from an organic solvent, and then reacting the diacetic acid with ammonia and then pyrolyzing the resulting compound to 2-ethyl-2-phenyl-3,5-thiamorpholinedione.

3. In the process for preparing a 2-R-2-$R^1$-4-$R^2$-3,5-thiamorpholinedione wherein R is lower alkyl; $R^1$ is selected from the class consisting of lower alkyl and mononuclear aryl; $R^2$ is selected from the class consisting of hydrogen, lower alkyl, lower alkenyl, mononuclear aryl-lower alkyl and mononuclear aryl-lower alkenyl, the steps comprising contacting a mixture of α-R-α-$R^1$-α-mercaptoacetic acid and α-R-α-$R^1$-α-mercaptoacetamide with monohaloacetic acid and subsequently acidifying the reaction mixture to form a precipitate consisting of α-R-α-$R^1$-thiodiacetic acid and the corresponding monoamide, separating said thiodiacetic acid and said monoamide by fractional crystallization from an organic solvent, contacting the α-R-α-$R^1$-thiodiacetic acid obtained by said fractional crystallization with a compound selected from the class consisting of ammonia and lower alkyl primary amine, lower alkenyl primary amine, mononuclear aryl-lower alkyl primary amine and mononuclear aryl-lower alkenyl primary amine, and then pyrolyzing the product of the last mentioned contacting to 2-R-2-$R^1$-4-$R^2$-3,5-thiamorpholinedione.

References Cited in the file of this patent

UNITED STATES PATENTS

| | | |
|---|---|---|
| 2,283,186 | Coghill | May 19, 1942 |
| 2,468,426 | Cheney et al. | Apr. 26, 1949 |
| 2,658,056 | Ham | Nov. 3, 1953 |
| 2,755,278 | Goldberg et al. | July 17, 1956 |
| 2,786,838 | Skinner et al. | Mar. 26, 1957 |

FOREIGN PATENTS

| | | |
|---|---|---|
| 472,320 | Canada | Mar. 20, 1951 |

OTHER REFERENCES

Heintz: Annalen der Chem. und Pharm., vol. 128, pp. 134–150 (1863).

Clemmensen et al.: Amer. Chem. Jour., vol. 40 (1908), pp. 280–302.

Nicolet et al.: Journ. of Am. Chem. Soc., vol. 49, pp. 2064–6 (1927).

Hellstrom: Z. physk. Chem., A, 157, pp. 242–68 (1931).

Beil.: Hand. der Org. Chem., vol. 27, p. 249 (1937), 4th ed.

Schinzel et al.: Bull. Soc. Chim. (5), vol. 6, pp. 501–9 (1939).